United States Patent
Hatta

(10) Patent No.: US 10,889,051 B2
(45) Date of Patent: Jan. 12, 2021

(54) HIGH-PRESSURE TANK FABRICATION METHOD

(71) Applicant: TOYOTA JIDOSHA KABUSHIKI KAISHA, Toyota (JP)

(72) Inventor: Ken Hatta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 16/139,667

(22) Filed: Sep. 24, 2018

(65) Prior Publication Data

US 2019/0091919 A1 Mar. 28, 2019

(30) Foreign Application Priority Data

Sep. 27, 2017 (JP) .................. 2017-187046

(51) Int. Cl.
*B29C 53/60* (2006.01)
*B29C 70/32* (2006.01)
(Continued)

(52) U.S. Cl.
CPC ............ *B29C 53/602* (2013.01); *B29C 70/32* (2013.01); *B29C 70/48* (2013.01); *B29C 70/86* (2013.01); *B29C 53/822* (2013.01); *B29K 2063/00* (2013.01); *B29K 2307/04* (2013.01); *B29K 2309/08* (2013.01); *B29L 2031/7156* (2013.01);
(Continued)

(58) Field of Classification Search
CPC ..... B29C 70/32; B29C 53/822; B29C 53/602; B29C 70/48; B29C 70/86; B29K 2063/00; B29K 2307/04; B29K 2309/08; F17C 2209/2118; F17C 2203/0604; F17C 2223/036; F17C 2209/2154; F17C 1/16; F17C 2270/0184; F17C 2209/232; F17C 2223/0123; F17C 2201/0109; F17C 2203/0665; F17C 2221/012; F17C 2270/0168; B29L 2031/7156
USPC ........ 156/169, 172, 173, 175; 220/589, 588, 220/590
See application file for complete search history.

(56) References Cited

U.S. PATENT DOCUMENTS

| 3,673,028 A | 6/1972 | Pearson |
| 2005/0077643 A1 | 4/2005 | Matsuoka |
| 2015/0329315 A1* | 11/2015 | Hatta ................. B65H 81/00 242/436 |

FOREIGN PATENT DOCUMENTS

| JP | 2005-113963 A | 4/2005 |
| JP | 2007-125844 A | 5/2007 |

(Continued)

OTHER PUBLICATIONS

Machine translation of JP2007-125844 A; Publication Date May 24, 2007.*

*Primary Examiner* — Vishal I Patel
(74) *Attorney, Agent, or Firm* — Finnegan, Henderson, Farabow, Garrett & Dunner, LLP

(57) ABSTRACT

A high-pressure tank fabrication method includes a pre-form fabrication step and a molding step. In the pre-form fabrication step a pre-form is fabricated by winding dry fiber bundles with different thicknesses (first fiber bundles and second fiber bundles) onto a liner in a state in which the dry fiber bundles with different thicknesses are made to be adjacent to one another. In the molding step, molding includes disposing the pre-form fabricated in the pre-form fabrication step in a mold and injecting resin.

14 Claims, 3 Drawing Sheets

(51) Int. Cl.
　　　*B29C 70/48* 　　　(2006.01)
　　　*B29C 70/86* 　　　(2006.01)
　　　*B29C 53/82* 　　　(2006.01)
　　　*B29K 63/00* 　　　(2006.01)
　　　*B29K 307/04* 　　　(2006.01)
　　　*B29K 309/08* 　　　(2006.01)
　　　*B29L 31/00* 　　　(2006.01)
　　　*F17C 1/16* 　　　(2006.01)

(52) U.S. Cl.
　　　CPC ........ *F17C 1/16* (2013.01); *F17C 2201/0109* (2013.01); *F17C 2203/0604* (2013.01); *F17C 2203/0665* (2013.01); *F17C 2209/2118* (2013.01); *F17C 2209/2154* (2013.01); *F17C 2209/232* (2013.01); *F17C 2221/012* (2013.01); *F17C 2223/0123* (2013.01); *F17C 2223/036* (2013.01); *F17C 2270/0168* (2013.01); *F17C 2270/0184* (2013.01)

(56) References Cited

FOREIGN PATENT DOCUMENTS

| | | |
|---|---|---|
| JP | 2011-245740 | 12/2011 |
| JP | 2017-056737 | 3/2017 |

\* cited by examiner

HIGH-PRESSURE TANK FABRICATION METHOD

CROSS-REFERENCE TO RELATED APPLICATION

This application is based upon and claims the benefit of priority of the prior Japanese Patent Application No. 2017-187046, filed on Sep. 27, 2017, the entire content of which is incorporated herein by reference.

TECHNICAL FIELD

The present disclosure relates to a high-pressure tank fabrication method.

RELATED ART

In relation to the fabrication of high-pressure tanks, a method is known in which a fiber bundle impregnated with an uncured resin (a pre-preg) is wound onto a liner to form a fiber layer, and then the resin is cured to form a reinforcing layer (for example, see paragraph 0002 in Japanese Patent Application Laid-Open (JP-A) No. 2011-245740 (Patent Document 1)).

There is also a method (resin transfer molding (RTM)) in which a pre-form is fabricated by a fiber bundle that is not impregnated with resin (a dry fiber bundle) being wound onto a liner to form a fiber layer, after which the pre-form is placed in a mold. In this state, resin is impregnated into the fiber layer while being cured to form a reinforcing layer. In the RTM method, a step of fabricating a pre-preg may be omitted, resulting in a reduction in costs.

When a high-pressure tank is fabricated by the RTM method, it is necessary to form the fiber layer of the pre-form thickly in order to assure strength. However, if the fiber layer of the pre-form is thick, then when the resin is being injected in the state in which the pre-form has been placed in the mold, it is difficult to impregnate the resin uniformly as far as inner layers of the fiber layer.

As a method for solving this problem, providing channels for resin in the fiber layer by winding on plural fiber bundles with gaps therebetween in a width direction has been considered. However, this reduces a fiber volume content ratio of the completed high-pressure tank, leading to reductions in strength and quality of the high-pressure tank.

SUMMARY

The present disclosure has been devised in consideration of the circumstances described above. An object of the present disclosure is to provide a high-pressure tank fabrication method with which a high-pressure tank of reliable quality may be fabricated at low cost.

A high-pressure tank fabrication method according to a first aspect includes: a pre-form fabrication step, including winding dry fiber bundles with different thicknesses onto a liner in a state in which the dry fiber bundles with different thicknesses are adjacent to one another, and a molding step, including disposing the pre-form fabricated in the pre-form fabrication step in a mold and injecting resin.

In the high-pressure tank fabrication method according to the first aspect, in the pre-form fabrication step for fabricating the pre-form, the dry fiber bundles of different thicknesses are wound onto the liner in states of being made to be adjacent to one another. Therefore, in the fiber layer of the fabricated pre-form, gaps are formed over the fiber bundles with relatively smaller thicknesses. These gaps function as channels for the resin when the resin is being injected in the molding step. Therefore, the resin is more easily impregnated as far as inner layers of the resin layer, and the uniformity of resin impregnation may be improved.

In a high-pressure tank fabrication method according to a second aspect, in the high-pressure tank fabrication method according to the first aspect, the pre-form fabrication step includes forming a fiber layer of at least 20 layers on a trunk portion of the liner.

When a fiber layer is formed with at least 20 layers in a pre-form fabrication step as in the pressure tank fabrication method according to the second aspect, it is usually difficult to impregnate the resin as far as the inner layers of the fiber layer. However, in this fabrication method, the resin channels are established by the fiber bundles with different thicknesses being wound onto the liner in the state in which the fiber bundles with different thicknesses are adjacent. Therefore, even though at least 20 layers of the fiber bundles are wound on, the resin is easily impregnated as far as the inner layers of the fiber layer. Consequently, the high-pressure tank may be fabricated with high strength.

In a high-pressure tank fabrication method according to a third aspect, in the high-pressure tank fabrication method according to the first aspect or the second aspect, the pre-form fabrication step includes arraying at least three of the fiber bundles in a width direction and winding on the fiber bundles at the same time, and in every combination of two fiber bundles that are adjacent to one another among the at least three fiber bundles, the two fiber bundles differ in thickness from one another.

In the high-pressure tank fabrication method according to the third aspect, in every combination of two fiber bundles that are adjacent to one another among the at least three fiber bundles that are arrayed in the width direction and wound on at the same time, the two fiber bundles differ in thickness from one another. Therefore, the gaps (resin channels) may be formed efficiently in the fiber layer of the pre-form.

In a high-pressure tank fabrication method according to a fourth aspect, in the high-pressure tank fabrication method according to the first aspect or the second aspect, the pre-form fabrication step includes arraying at least three of the fiber bundles in a width direction and winding on the fiber bundles at the same time; in every combination of two fiber bundles that are adjacent to one another among the at least three fiber bundles, the two fiber bundles differ in thickness from one another; and a number of classes of thickness dimension included in the at least three fiber bundles that are wound on in the pre-form fabrication step is two.

In the high-pressure tank fabrication method according to the fourth aspect, in every combination of two fiber bundles that are adjacent to one another among the at least three fiber bundles that are arrayed in the width direction and wound on at the same time, the two fiber bundles differ in thickness from one another. In addition, because there are two classes of thickness dimension in the plural fiber bundles that are wound on in the pre-form fabrication step, the gaps (resin channels) may be formed efficiently in the fiber layer of the pre-form, in addition to which a small number of classes of fiber bundle may be employed and costs may be reduced.

In a high-pressure tank fabrication method according to a fifth aspect, in the high-pressure tank fabrication method according to any one of the first to fourth aspects, a plurality of the fiber bundles that are wound on at the same time in the pre-form fabrication step are equal to one another in fiber weight per unit length.

In the high-pressure tank fabrication method according to the fifth aspect, the fiber weights per unit length of the plural fiber bundles wound on in the pre-form fabrication step are equal to one another. Therefore, the gaps (resin channels) formed in the fiber layer of the pre-form are more likely to be filled uniformly with fibers in compression molding in the molding step. Therefore, the gaps between the fibers in the pre-form may be more efficiently diminished in the fabricated item subsequent to the molding step.

In a high-pressure tank fabrication method according to a sixth aspect, in the high-pressure tank fabrication method according to any one of the first to fifth aspects, the pre-form fabrication step includes at least winding the dry fiber bundles with different thicknesses onto the liner by hoop winding in the state in which the dry fiber bundles with different thicknesses are adjacent to one another.

It is particularly hard to impregnate a resin into a fiber layer formed by hoop winding. However, in the high-pressure tank fabrication method according to the sixth aspect, the dry fiber bundles of different thicknesses are wound onto the liner in states of being made adjacent to one another. As a result, uniformity of the resin impregnation may be improved effectively.

In a high-pressure tank fabrication method according to a seventh aspect, in the high-pressure tank fabrication method according to any one of the first to sixth aspects, the molding step includes compression molding that includes, after injecting the resin, completely closing the mold.

In the molding step of the high-pressure tank fabrication method according to the seventh aspect, after the pre-form is disposed inside the mold and the resin is injected, the mold is completely closed and a fiber-reinforced plastic layer is compression-molded. Therefore, the gaps between the fibers in the pre-form may be effectively diminished in the fabricated item subsequent to the molding step.

As described above, according to the present disclosure, a high-pressure tank of reliable quality may be fabricated at low cost.

DETAILED DESCRIPTION

Figure 1:
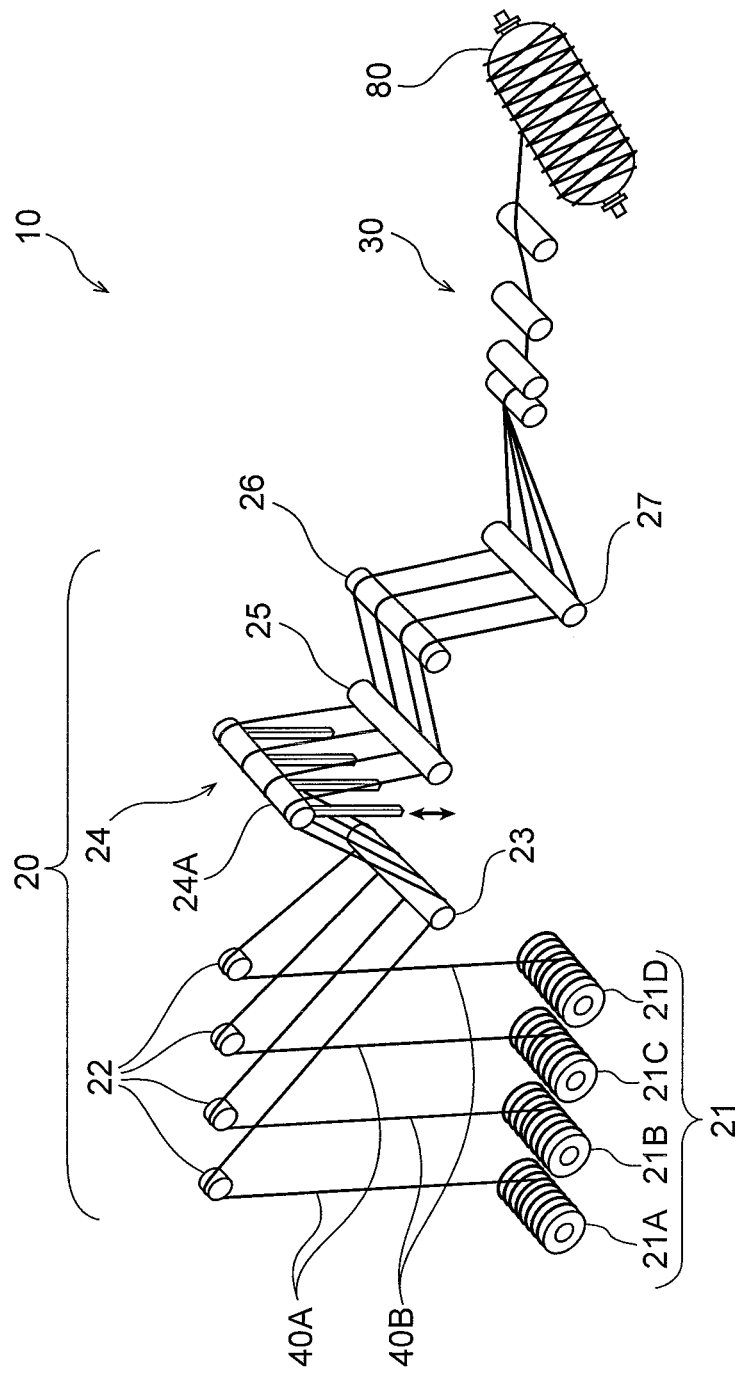
FIG. 1 is an overall structural diagram showing a filament-winding device according to an exemplary embodiment.

First, a filament-winding device 10 according to an exemplary embodiment is described using FIG. 1, and a pre-form fabrication step with the filament-winding device 10 is described.

FIG. 1 shows overall structure of the filament-winding device 10. The filament-winding device 10 is a device for fabricating a high-pressure tank (a high-pressure hydrogen tank) to be mounted in a fuel cell vehicle. The filament-winding device 10 is used for supplying fiber bundles 40 at high speeds and winding the fiber bundles 40 onto a liner 80.

As shown in FIG. 1, the filament-winding device 10 is equipped with an unwinding section 20 and an abutment section 30.

In order from an upstream side, the unwinding section 20 includes a plural number (four in the present exemplary embodiment) of bobbins 21, plural unwinding rollers 22 provided in correspondence with the bobbins 21, a bundling roller 23, an active dancer 24, and a plural number (three in the present exemplary embodiment) of conveyance rollers 25, 26 and 27.

The fiber bundles 40 are wound onto the bobbins 21. The fiber bundles 40 are "dry" carbon fiber bundles that are not impregnated with resin.

The plural bobbins 21 are constituted by, in order from the left side of the drawing, a first bobbin 21A, a second bobbin 21B, a third bobbin 21C and a fourth bobbin 21D. First fiber bundles 40A are wound onto the first bobbin 21A and the third bobbin 21C, and second fiber bundles 40B are wound onto the second bobbin 21B and the fourth bobbin 21D. The first fiber bundles 40A have, for example, a width of 9 mm and a thickness of 0.1 mm, and the second fiber bundles 40B have, for example, a width of 6 mm and a thickness of 0.15 mm. The first fiber bundles 40A and the second fiber bundles 40B are each constituted of approximately 36,000 carbon fibers. That is, the first fiber bundles 40A and the second fiber bundles 40B have the same fiber weight per unit length as one another but differ from one another in width and thickness.

The unwinding rollers 22 convey the fiber bundles 40 unwound from the bobbins 21 to the bundling roller 23. The bundling roller 23 gathers the fiber bundles 40 unwound from the bobbins 21 and unwinds the fiber bundles 40 onto the active dancer 24. The active dancer 24 adjusts tensions in the fiber bundles 40 by moving rollers 24A (see the arrows in FIG. 1). The fiber bundles 40 whose tensions have been adjusted are conveyed to the abutment section 30 via the plural conveyance rollers 25, 26 and 27. The abutment section 30 gathers the plural (four) fiber bundles 40, applies appropriate tensions, and organizes a configuration of the fiber bundles 40. The fiber bundles 40 whose configuration has been organized by the abutment section 30 are wound onto the liner 80.

Figure 2A:
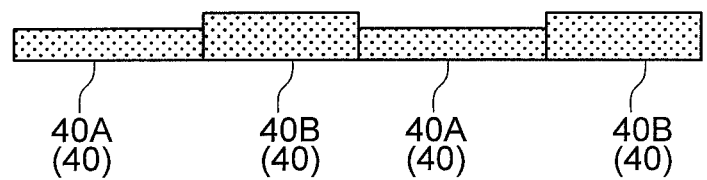
FIG. 2A is a schematic diagram showing a state in which plural fiber bundles, which is to say four fiber bundles, are arrayed in a width direction when being wound onto a liner.

When the plural fiber bundles 40 unwound from the plural bobbins 21 are being wound onto the liner 80, the fiber bundles 40 are arrayed in a width direction as shown in FIG. 2A. The array order matches the order from the first bobbin 21A to the fourth bobbin 21D. Thus, from the left side of FIG. 2A, the first fiber bundle 40A, the second fiber bundle 40B, the first fiber bundle 40A and the second fiber bundle 40B are arrayed in this order in the width direction. Therefore, in every combination of two adjacent fiber bundles 40 among the four fiber bundles 40 arrayed in the width direction (three combinations in total), the two adjacent fiber bundles 40 differ in thickness from one another. Moreover, control is applied such that gaps are not formed in the width direction between any two adjacent fiber bundles 40.

In this state in which the plural fiber bundles 40 are arrayed in the width direction, the plural fiber bundles 40 are wound on in many windings so as to completely cover the liner 80, forming a resin layer 52 (see FIG. 2B) on the liner 80. In this manner, a pre-form 50 is fabricated.

That is, the fabricated pre-form is provided with the liner 80 and with the resin layer 52 that is formed by the fiber bundles 40 being wound onto the liner 80. The number of layers of the fiber bundles 40 forming the resin layer 52 is not particularly limited but is, for example, around 20 to 30 layers at a trunk portion of the liner 80. The thickness of the resin layer 52 is also not particularly limited but is, for example, 20 to 30 mm. The meaning of the term "trunk portion" is intended to include a portion of the liner 80 with a cylindrical shape midway along an axial direction of the liner 80 (i.e., a portion that is sandwiched between dome portions).

Figure 2B:
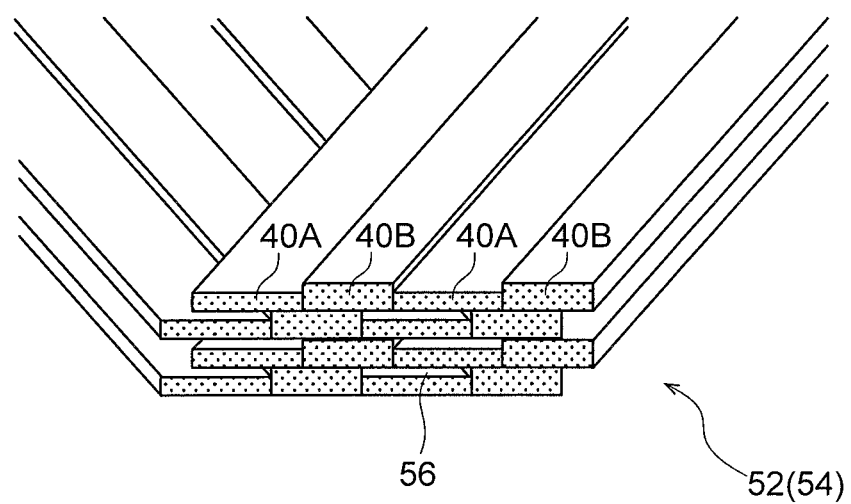
FIG. 2B is a sectional diagram schematically showing a fiber layering structure of a fiber layer of a pre-form.

FIG. 2B is a schematic diagram in which a fiber layering structure 54 of the resin layer 52 is shown magnified. As shown in FIG. 2B, between layers that are superposed in the thickness direction (the vertical direction in FIG. 2B), gaps 56 are formed over the first fiber bundles 40A, which are the bundles with a relatively smaller thickness. The gaps 56 function as resin channels along which resin flows in an RMT molding step, which is described below.

Figure 3A:
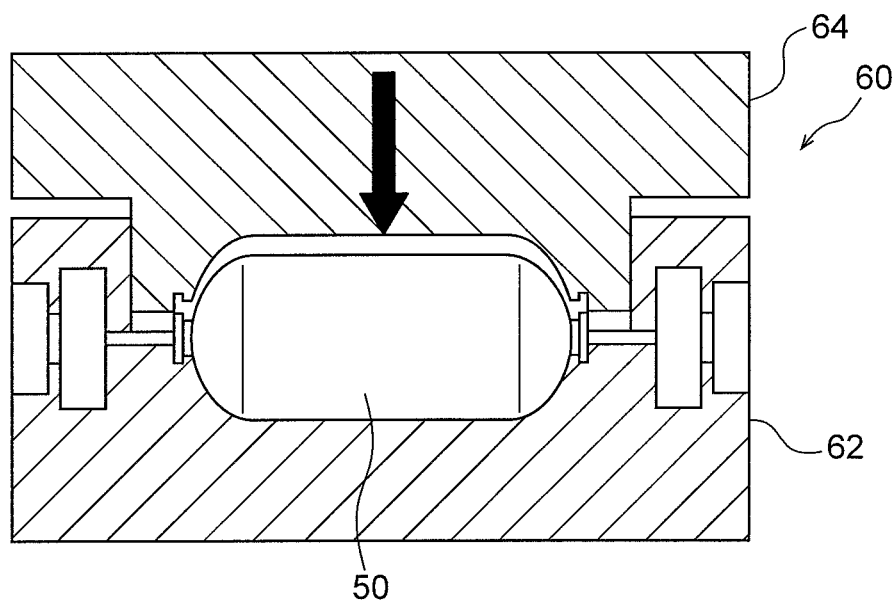
FIG. 3A is a sectional diagram showing a state in which an epoxy resin is being injected in an RTM molding step.
Figure 3B:
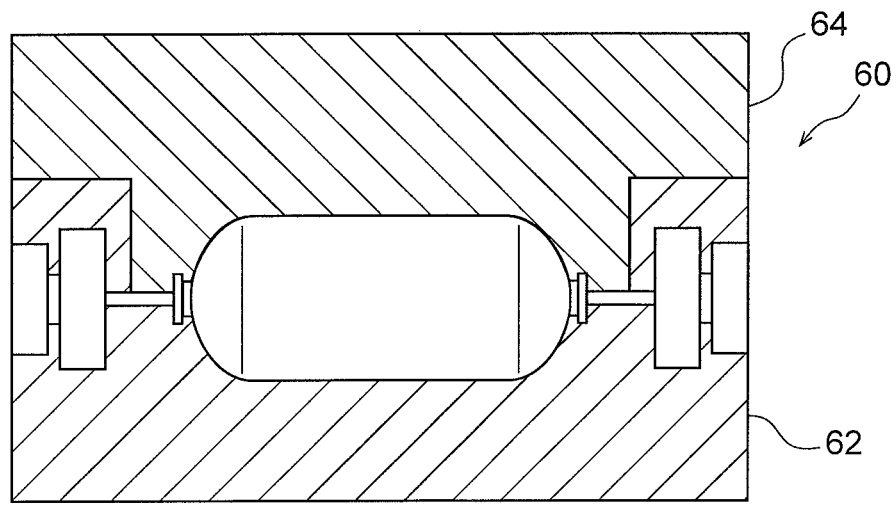
FIG. 3B is a sectional diagram showing a state in which a mold is completely closed in the RTM molding step.

Now a molding step, which is the RTM molding step, is described using FIG. 3A and FIG. 3B.

First, the pre-form 50 is placed in a mold 60 including an upper die 64 and a lower die 62. Then, as shown in FIG. 3A, the mold 60 is put into a state that is not completely closed but is a slightly open state (for example, a state that is opened by a few millimetres relative to a bottom end). In this state, an epoxy resin is injected (see the arrow in FIG. 3A). The interior of the mold 60 may be evacuated when the epoxy resin is to be injected.

Then, as shown in FIG. 3B, the upper die 64 is lowered to the bottom end and the mold 60 is completely closed. Thus, the resin layer 52 into which the epoxy resin has been injected and packed is uniformly compressed in the thickness direction. Hence, the epoxy resin inside the mold 60 is heated and cured. Injection compression molding is conducted as described above.

Operational Effects

Now, operational effects of the present exemplary embodiment are described.

In the present exemplary embodiment, in the pre-form fabrication step for forming the pre-form 50, as shown in FIG. 2A, the fiber bundles 40 that are dry fiber bundles of different thicknesses are wound onto the liner 80 in states of being made adjacent to one another. As a result, in the resin layer 52 of the pre-form 50 that is fabricated as shown in FIG. 2B, the gaps 56 are formed over the first fiber bundles 40A that are the fiber bundles with the relatively smaller thickness. The gaps 56 function as resin channels 56 through which the epoxy resin flows in the RTM molding step that is the molding step. Consequently, the epoxy resin is easily impregnated as far as the inner layers of the resin layer 52, and uniformity of the resin impregnation may be improved.

In the molding step, after the pre-form 50 is disposed in the mold and the resin is injected, compression molding (that is, injection compression molding) is conducted by completely closing the mold 60. Therefore, the resin layer 52 into which the epoxy resin has impregnated may be uniformly compressed in the thickness direction, and the gaps 56 between the fibers in the pre-form 50 may be effectively diminished in the fabricated item subsequent to the molding step.

In the present exemplary embodiment, of the plural (four) fiber bundles 40 that are arrayed in the width direction and wound on at the same time, gaps are not formed between any two adjacent fiber bundles in the width direction in the resin layer 52. Therefore, a fiber volume content ratio of the fabricated item tends to be higher than in a mode in which gaps are formed in the width direction between pairs of adjacent bundles in the resin layer 52. Consequently, the high-pressure tank may be fabricated with high strength.

In the present exemplary embodiment, in every combination of two fiber bundles that are adjacent to one another among the four fiber bundles that are arrayed in the width direction and wound on at the same time (a total of three combinations), the two adjacent fiber bundles differ in thickness from one another. Therefore, the gaps 56 (the resin channels) may be formed in the resin layer 52 of the pre-form 50 efficiently.

In the present exemplary embodiment, the number of classes of thickness dimension included in the plural fiber bundles 40 that are wound on in the pre-form fabrication step is two (the first fiber bundles 40A and the second fiber bundles 40B). Therefore, the number of fiber bundles 40 to be prepared can be smaller than in a mode in which fiber bundles 40 with three or more classes of thickness dimension are employed, and costs are lower.

In the present exemplary embodiment, the fiber weights per unit length of the plural fiber bundles 40 that are wound on in the pre-form fabrication step are equal to one another. Therefore, the gaps (the resin channels) that are formed in the fiber layers of the pre-form are more likely to be uniformly filled with fibers in the molding step. Hence, the gaps 56 between the fibers in the pre-form 50 may be even more effectively diminished in the fabricated item subsequent to the molding step.

—Supplementary Descriptions—

In the above exemplary embodiment, an example is described in which four of the fiber bundles 40 are arrayed in the width direction and wound round at the same time (see FIG. 2A), but the present disclosure is not limited thus. There may be two or three bundles, and there may be five or more bundles.

Further, in the above exemplary embodiment, an example is described in which adjacent fiber bundles (the first fiber bundle 40A and the second fiber bundle 40B) differ both in thickness and in width, but the present disclosure is not limited thus. For example, adjacent bundles with different thicknesses may have the same width.

In the above exemplary embodiment, an example is described in which, although adjacent fiber bundles (the first fiber bundle 40A and the second fiber bundle 40B) differ in thickness, they have the same fiber weights per unit length. However, the present disclosure is not limited thus.

In FIG. 2B, a situation is schematically illustrated in which winding angles of the winding onto the liner 80 differ greatly from one another between adjacent layers superposed in the layering direction, but the present disclosure is not limited thus. The gaps 56 may be formed even if the difference between winding angles is small rather than large.

In the above exemplary embodiment, an example is described in which gaps are not formed in the width direction between the adjacent fiber bundles 40 (see FIG. 2A and FIG. 2B), but the present disclosure is not limited thus. It is acceptable for gaps (i.e., gaps in the width direction) to be formed to some extent.

In the above exemplary embodiment, an example is described in which, in every combination of two fiber bundles that are adjacent to one another among the four fiber bundles that are arrayed in the width direction and wound on at the same time (a total of three combinations), the two adjacent fiber bundles differ in thickness from one another, but the present disclosure is not limited thus. For example, of the four fiber bundles 40 that are arrayed in the width direction and wound on at the same time, one bundle may be the second fiber bundle 40B with the relatively smaller thickness and the other three bundles may be the first fiber bundles 40A with the relatively larger thickness.

In the above exemplary embodiment, an example is described in which the fiber bundles are carbon fiber bundles, but the fiber bundles may be, for example, glass fiber bundles. Furthermore, in the above exemplary embodiment, an example is described in which the resin is an epoxy resin, but the type of resin is not limited thus.

In the above exemplary embodiment, an example is described in which compression molding is conducted by completely closing the mold 60 after injecting the resin, but the present disclosure is not limited thus. The resin may be injected in the state in which the mold is completely closed.

It is particularly difficult to impregnate resin into a fiber layer formed by hoop winding of the trunk portion of the liner 80 (i.e., winding substantially orthogonal to the central axis of the liner 80). Therefore, using fibers with different thicknesses in hoop winding of the trunk portion of the liner 80 is preferable.

What is claimed is:

1. A high-pressure tank fabrication method comprising:
   a pre-form fabrication step, including winding dry fiber bundles with different thicknesses onto a liner in a state in which the dry fiber bundles with different thicknesses are adjacent to one another; and
   a molding step, including disposing the pre-form fabricated in the pre-form fabrication step in a mold and injecting resin,
   wherein the pre-form fabrication step includes at least winding the dry fiber bundles with different thicknesses onto the liner by hoop winding in the state in which the dry fiber bundles with different thicknesses are adjacent to one another.

2. The high-pressure tank fabrication method according to claim 1, wherein the pre-form fabrication step includes forming a fiber layer of at least 20 layers on a trunk portion of the liner.

3. The high-pressure tank fabrication method according to claim 1, wherein:
   the pre-form fabrication step includes arraying at least three of the fiber bundles in a width direction and winding on the fiber bundles at a same time; and
   in every combination of two fiber bundles that are adjacent to one another among the at least three fiber bundles, the two fiber bundles differ in thickness from one another.

4. The high-pressure tank fabrication method according to claim 2, wherein:
   the pre-form fabrication step includes arraying at least three of the fiber bundles in a width direction and winding on the fiber bundles at a same time; and
   in every combination of two fiber bundles that are adjacent to one another among the at least three fiber bundles, the two fiber bundles differ in thickness from one another.

5. The high-pressure tank fabrication method according to claim 1, wherein:
   the pre-form fabrication step includes arraying at least three of the fiber bundles in a width direction and winding on the fiber bundles at a same time;
   in every combination of two fiber bundles that are adjacent to one another among the at least three fiber bundles, the two fiber bundles differ in thickness from one another; and
   a number of classes of thickness dimension included in the at least three fiber bundles that are wound on in the pre-form fabrication step is two.

6. The high-pressure tank fabrication method according to claim 2, wherein:
   the pre-form fabrication step includes arraying at least three of the fiber bundles in a width direction and winding on the fiber bundles at a same time;
   in every combination of two fiber bundles that are adjacent to one another among the at least three fiber bundles, the two fiber bundles differ in thickness from one another; and
   a number of classes of thickness dimension included in the at least three fiber bundles that are wound on in the pre-form fabrication step is two.

7. The high-pressure tank fabrication method according to claim 1, wherein a plurality of the fiber bundles that are wound on at a same time in the pre-form fabrication step are equal to one another in fiber weight per unit length.

8. The high-pressure tank fabrication method according to claim 2, wherein a plurality of the fiber bundles that are wound on at a same time in the pre-form fabrication step are equal to one another in fiber weight per unit length.

9. The high-pressure tank fabrication method according to claim 3, wherein a plurality of the fiber bundles that are wound on at the same time in the pre-form fabrication step are equal to one another in fiber weight per unit length.

10. The high-pressure tank fabrication method according to claim 5, wherein a plurality of the fiber bundles that are wound on at the same time in the pre-form fabrication step are equal to one another in fiber weight per unit length.

11. The high-pressure tank fabrication method according to claim 1, wherein the molding step includes compression molding that includes, after injecting the resin, completely closing the mold.

12. The high-pressure tank fabrication method according to claim 2, wherein the molding step includes compression molding that includes, after injecting the resin, completely closing the mold.

13. The high-pressure tank fabrication method according to claim 3, wherein the molding step includes compression molding that includes, after injecting the resin, completely closing the mold.

14. The high-pressure tank fabrication method according to claim 5, wherein the molding step includes compression molding that includes, after injecting the resin, completely closing the mold.

* * * * *